Oct. 1, 1968   P. H. MILLER, JR   3,404,400
SIGNALLING METHOD AND APPARATUS
Filed April 17, 1967   5 Sheets-Sheet 1
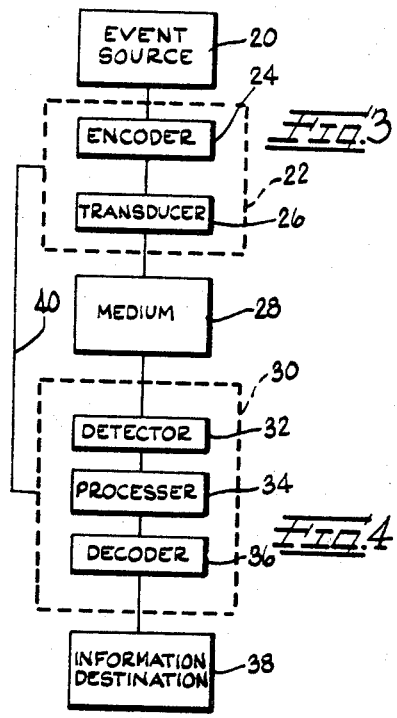
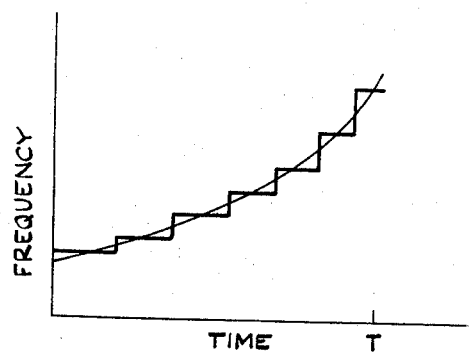
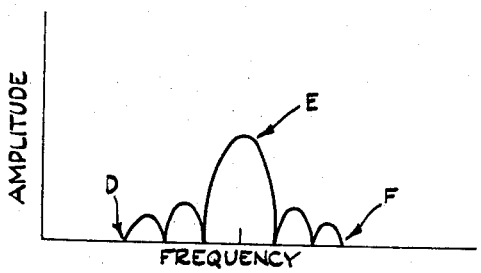
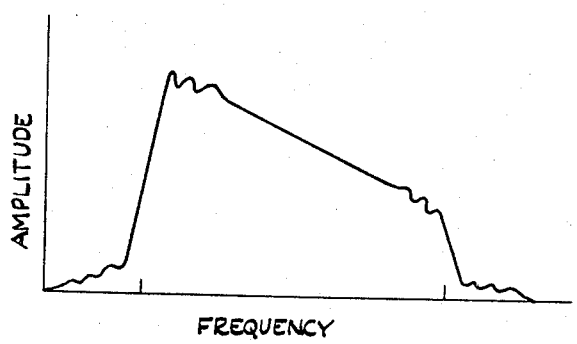
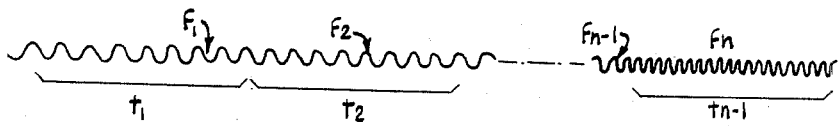
INVENTOR
PARK H. MILLER JR.
BY Anderson, Luedeka, Fitch, Even, & Tabin
ATTORNEYS

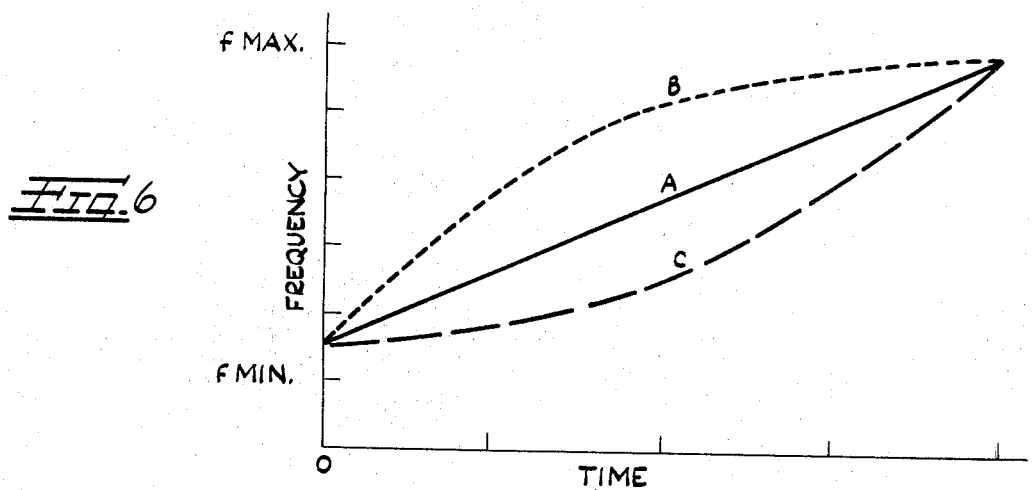
Fig. 6
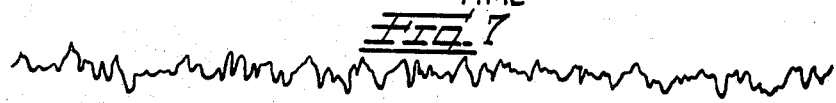
Fig. 7
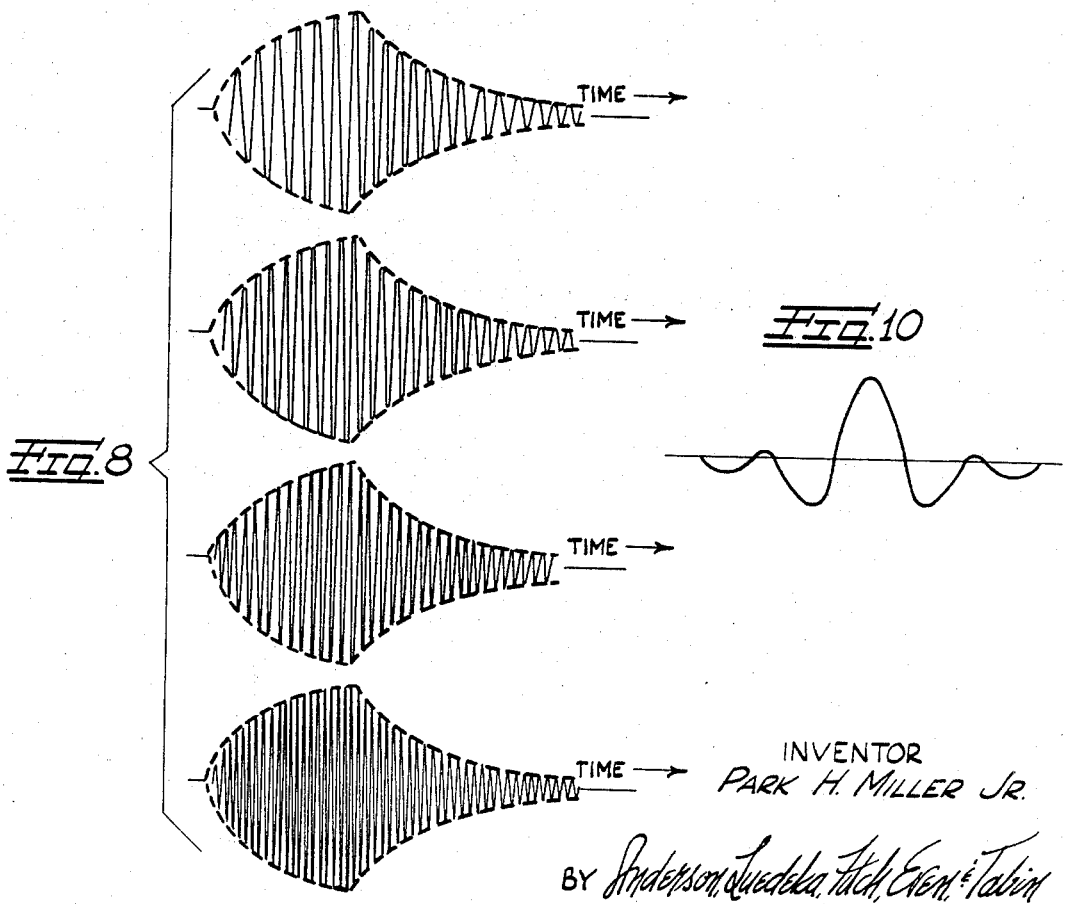
Fig. 8
Fig. 10
INVENTOR
PARK H. MILLER JR.
BY Anderson, Luedeka, Fitch, Even & Tabin
ATTORNEYS

INVENTOR
PARK H. MILLER JR.

BY Anderson, Luedeka, Fitch, Even & Tabin
ATTORNEYS

Oct. 1, 1968  P. H. MILLER, JR  3,404,400
SIGNALLING METHOD AND APPARATUS
Filed April 17, 1967  5 Sheets-Sheet 5
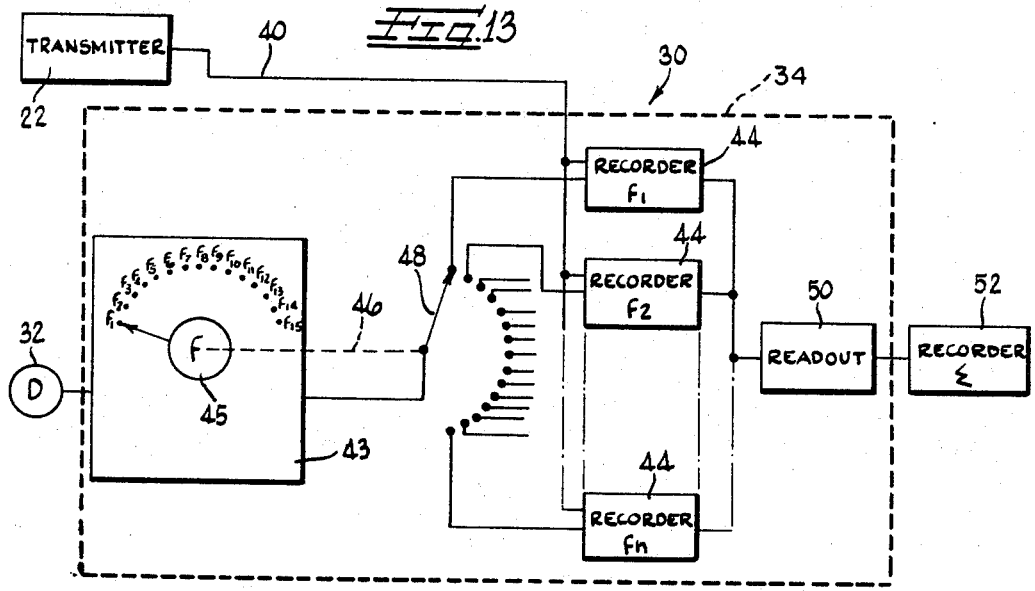
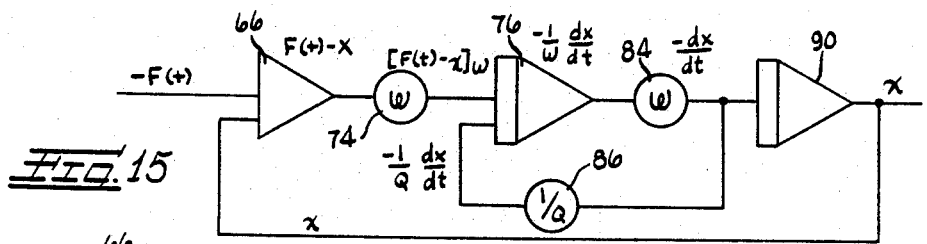
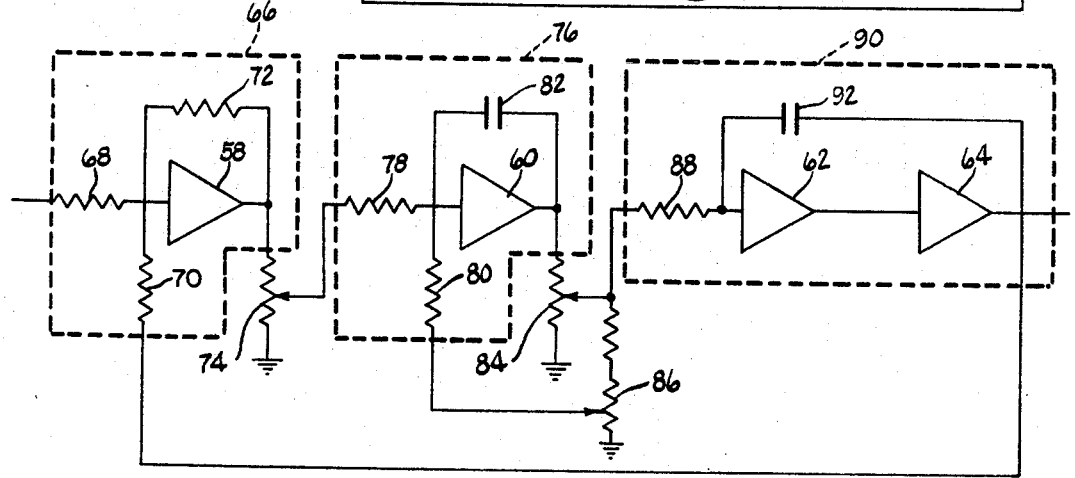
INVENTOR
PARK H. MILLER JR.
BY Anderson, Luedeka, Fitch, Even & Tabin
ATTORNEYS

United States Patent Office 3,404,400
Patented Oct. 1, 1968

3,404,400
SIGNALLING METHOD AND APPARATUS
Park H. Miller, Jr., Del Mar, Calif., assignor, by mesne assignments, to Gulf General Atomic Incorporated, San Diego, Calif., a corporation of Delaware
Filed Apr. 17, 1967, Ser. No. 631,267
27 Claims. (Cl. 343—17.2)

ABSTRACT OF THE DISCLOSURE

A novel matched filter and a method of signalling utilizing such a matched filter are used with a particular signal to produce a compressed pulse. The transmitted signal is a number of short wave trains of different frequencies. The received signal is applied to the matched filter comprising active filters tuned to respective transmitted frequencies to produce filtered wave trains corresponding to the transmitted wave trains. The filtered wave trains are combined in the matched filter in such predetermined relationship as to produce a pulse signal compressed in time relative to the duration of the respective wave trains.

---

This application is a continuation-in-part of application Ser. No. 382,086 now Patent Number 3,369,229 by Park H. Miller, Jr., Dwight C. Pound and Herschel R. Snodgrass, filed July 13, 1964, assigned to the assignee of the present application and entitled, "Seismic Prospecting," and of application Ser. No. 539,381 by Park H. Miller, Jr., filed Apr. 1, 1966, assigned to the assignee of the present application and entitled, "Method and System for Communication of Information."

This invention relates generally to signalling systems and methods and, more particularly, to a signalling system and method of the pulse compression type utilizing an improved matched filter for processing received signals of an improved type. The improved matched filter and signalling method have broad applicability but have particular utility for seismic prospecting where signal travel time is determined and in communication where identity of a signal is determined. Both operations must often be performed under adverse noise conditions, the effects of which may be alleviated using the present invention. The parent applications mentioned above are directed to particular combinations including the matched filter of the present invention and involve specific usages of the general signalling method claimed herein.

In general, signalling systems are utilized both in information transfer or communication systems wherein information is transmitted through a medium from one location to another and also in information obtaining systems wherein information about a medium or objects in the medium is obtained by observing the characteristics of signals received after they have traveled through the medium. A familiar example of the latter type of system is a seismic prospecting system where various parameters of the received signal such as its travel time may be indicative of the relative distance or other characteristics of a signal transmitter located in the medium, of characteristics of a structure in the medium which in some way affects the signal during transmission such as by reflection or refraction, or of characteristics of the transmitting medium itself.

The amount of information which can be communicated or obtained by a signalling system depends upon the ratio of the information signal to the noise introduced into the signal, upon the bandwidth of the channel through which the signal is directed and upon the length of time during which transmission of the information signal takes place.

In order to overcome the adverse effects of noise on the amount of information communicated or obtained, it is generally desirable to increase the rate at which the transmitter applies energy to the medium, thereby increasing the signal power and the signal-to-noise ratio. In any signalling system, however, the rate at which energy may be applied to the system is subject to the physical limitations of the transmitter components. Consequently, it is sometimes expedient to apply the energy of the signal over a longer period of time.

On the other hand, as the amount of time during which a given amount of signal energy is applied and is received increases, the rate of transmission or of obtaining of information will ordinarily decrease. Indeed in some systems for obtaining information where it is desired to learn the distance of a particular reflecting structure in a medium, as in seismic prospecting, an overly long transmitted signal makes it difficult or impossible to relate the time of receipt of the signal to its time of transmission. Accordingly, for rapid and accurate transmission or obtaining of information, it is desirable to use high energy pulses or wave trains having relatively limited duration.

One approach to this problem of increasing the effective capacity of a signalling system without exceeding the physical limitations of the system components is to transmit and receive relatively low energy wave trains having relatively long duration and to process the received wave trains so as to produce signals of high energy and relatively short duration, a process referred to generally as pulse compression. By this means a transmitted signal may be utilized which does not entail use of transmitter components of high peak power capacity. At the same time, the processed signal is more easily distinguished from noise, and its characteristics, such as its time of receipt, are more easily analyzed than would be true of the longer, lower energy, unprocessed signal.

With respect to pulse compression systems utilizing transmitted signals of varying frequency, two general types of signal processing techniques may be utilized. One type of processing technique calls for the correlation of the received signal with the transmitted signal. Generally such operations are not readily performed in real time, so that delays in the obtaining of usable data are imposed.

The other general type of processing technique for signals of varying frequency utilizes a matched filter system, i.e., a signal processing system having characteristics which are matched to those of the input signal to produce an optimum processed signal. In general, a matched filter functions by delaying various portions of the signal relative to other portions so that the resulting processed signal has a relatively shorter duration and greater amplitude than both the transmitted signal and the received signal. As a result the signal is compressed in time and hence is more easily distinguished from noise. Further, its characteristics are more easily analyzed.

A common form of matched filter is designed for use with a signal whose frequency varies continuously with time in a predetermined fashion. One such matched filter system utilizes electromagnetic waves comprising a long signal whose frequency is linearly swept; that is, frequency is a linear function of time. This procedure yields a simple relationship between the instantaneous frequency of the signal and time. This relationship may readily be exploited in the processing of the received signal to produce a compressed signal. More particularly, a filter may be provided which includes a dispersive delay line having a linear time delay versus frequency characteristic such that it will delay one end of the long received signal by a greater amount than the other end so as to compress the signal in time and increase the peak amplitude.

This system, however, is not readily converted to applications which involve signals in the form of mechanical waves with relatively long durations such as, for example, seismic waves. A mechanical dispersive delay line suitable for such an application with a signal one second long would be required to be 20 miles in length, an obviously impractical arrangement.

Another common type of matched filter system utilizes a much shorter delay line with a large number of output taps arranged with respect to the transmitted waveform so that their outputs are all in phase and reach a maximum at a particular time. More particularly, utilizing a waveform whose frequency varies continuously over a specified bandwidth, the delay line is tapped at positions selected in accordance with the variations in frequency so as to place the outputs of all the taps in phase at a particular time. The in-phase signals, which are the outputs of the respective taps, are then combined to form a compressed pulse. In order to achieve maximum pulse compression such a system requires a large number of taps, equal to the product of twice the average frequency of the signal and the duration of the signal.

Utilizing seismic waves this product is often about three hundred since a typical seismic signal contains frequencies between 10 and 100 cycles per second and lasts about three seconds. Construction of such a delay line matched filter is expensive in view of the large number of taps required and the further consideration that slight adjustments in all of the tap positions must be provided for, due to phase shifts in the signal which may be introduced by the transmitter and the receiver and in the medium through which the signal travels.

Moreover, as previously noted, the information capacity of a signalling systme depends upon the bandwith of the channel as well as the signal-to-noise ratio. Utilization of a frequency modulated wave train, as is done with the matched filter, pulse compression techniques described above requires a channel with a relatively large bandwidth. Unfortunately, the available bandwidth is often limited by such factors as the nature of the medium in which the waves travel and the characteristics of available components for signalling systems. As a result, matched filter and other signalling systems utilizing pulse compression techniques have proved costly due to the need for large bandwidth or high signal power, as well as the long delay lines or large number of delay line taps in the types of matched filter systems described above.

An important feature of the present invention is to provide a pulse compression signalling system and method utilizing an improved form of matched filter with which the capacity of the system may be substantially optimized within limitations of available bandwidth and signal power without unduly increasing the cost of the system. This result is achieved by applying a particular type of transmitted signal to the medium and processing the received signal through a particular type of matched filter. Specifically, each signal is in the form of a plurality of wave trains which are of substantial limited duration and each of the wave trains is at a different respective substantially constant frequency. This signal approximates a signal whose instantaneous frequency varies continuously, yet upon receipt it is capable of being processed by relatively simple and inexpensive apparatus.

The resulting signal which is received after passage through the medium is applied to an active filter to produce a separate filtered wave train corresponding to each of the transmitted wave trains. The active filter not only reduces noise introduced in the medium but also produces filtered wave trains of a particular and highly useful form. The filtered wave trains are then combined in a particular time relationship such as to provide a pulse corresponding to the transmitted signal which has a relatively large amplitude and occurs in a time shorter than the durations of the transmitted wave trains. The transmitted signal is related to an event such as a time reference datum in a seismic prospecting system where the time of travel of the signal after reflection from a stratum is indicative of the distance of the stratum or such as a code symbol in a communication system. The transmitted signal may be related to the event by adjustment of such parameters of the applied wave trains as their times, polarities, or frequencies. Similarly, the time-compressed pulse is related to the event, since it is produced from the received signal resulting from the transmitted signal. The relationship of the compressed pulse to the event may be determined by its parameters such as time, polarity and frequency spectrum. This relationship may either be indicative of information as to the event itself in a communication system or of the effect of the medium on the signal as in a seismic prospecting system.

It is therefore an important object of the present invention to provide an improved signalling system and method.

Another object of the invention is to provide an improved signalling system utilizing a particular form of signal and a matched filter therefor which is highly effective and relatively simple in construction and operation.

Another object of the invention is to provide an improved signalling system which has a relatively high capacity for both obtaining and transmitting information within a narrow bandwidth and which can utilize power sources of limited strength and signal receiving and processing apparatus which is relatively simple and inexpensive.

A still further object of the invention is to provide a matched filter signalling method in which for various applications use may readily be made of a variety of characteristics and relationships of both the transmitted and the compressed signals including time, amplitude and polarity.

Another object of the invention is to provide a matched filter signalling system utilizing receiving and processing components which are reliable and easily maintainable and which is simple in construction and operation, thereby providing cost advantages over present systems.

Still another object of the invention is to provide an improved method of simultaneously transmitting a number of signals in a narrow bandwidth channel which signals can be distinguished readily.

Yet another object of the invention is to provide a useful solution to the problems of how to achieve high signal-to-noise ratios in signalling systems without undue sacrifice of speed or excessive bandwidth requirements.

Another object of the invention is to provide a signalling method and system with which all or a selected portion of the changes in a transmitted signal occasioned by the passage of the signal through a medium may be offset in such a manner that the processed signal is the same as if the transmitted signal had reached the receiver relatively uninfluenced by the medium.

Still another object of the invention is to provide a signalling method and system utilizing signals which may be processed by relatively simple and inexpensive operational filters and by either digital or analog techniques.

Other objects and advantages of the present invention will become apparent by reference to the following description when taken in conjunction with the accompanying drawings in which:

FIGURE 1 is a diagrammatic illustration of the signalling system of the present invention;

FIGURE 2 is a diagram of the amplitude versus time characteristics of a typical transmitted signal utilized in practicing the invention;

FIGURE 3 is a diagram of the frequency versus time characteristics of the transmitted signal of FIGURE 2 and of the signal having a continuous frequency variation which it approximates;

FIGURE 4 is a diagram of the amplitude versus frequency characteristics of one of the wave trains illustrated in FIGURE 2;

FIGURE 5 is a diagram of the amplitude versus frequency characteristics of the entire transmitted signal of FIGURE 2;

FIGURE 6 illustrates the frequency versus time characteristics of three other signals which may be approximated by the signal of the present invention;

FIGURE 7 is an illustration of a typical signal as received after the passage of the transmitted signal through the medium and the consequent addition of noise.

FIGURE 8 shows certain typical, idealized waveforms as produced by applying the transmitted wave trains described herein to the active filter means described herein;

FIGURE 10 is an illustration of a combined signal produced by combining the idealized waveforms of FIGURE 8;

FIGURE 13 is a diagrammatic illustration of a signal processing system illustrating various features of the invention;

FIGURE 15 is a diagrammatic illustration of one embodiment of an active filter useful in the processing systems shown in FIGURES 13 and 14;

FIGURE 16 is a schematic illustration of the filter shown in FIGURE 15;

Figure 9:
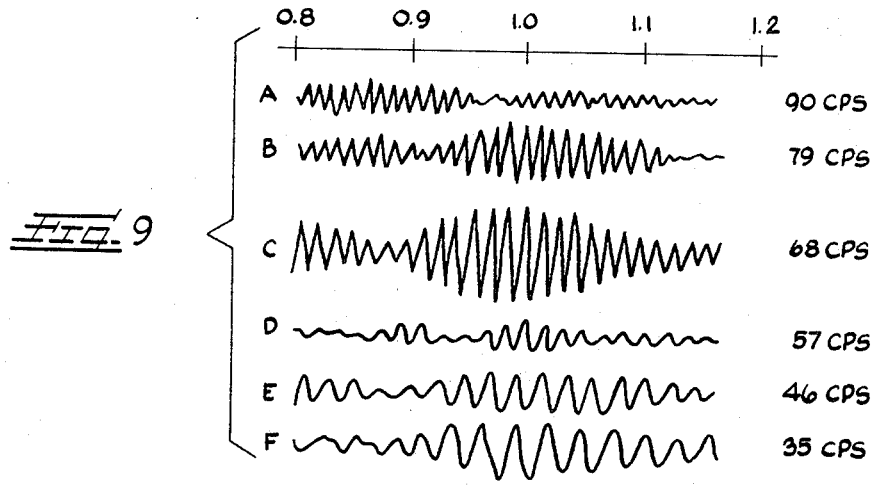
FIGURE 9 shows typical actual waveforms as produced by applying the received signal to the active filter means described herein.

As illustrated in FIGURE 1, the signalling system generally includes an event or information source 20 which actuates a transmitter 22. The transmitter includes a control system or encoder 24 and a transducer or wave generator 26. The encoder 24 determines the form of the waves which are to be applied to a medium 28 in accordance with a message or with information supplied by the event or information source 20 while the transducer 26 applies waves to the medium 28 in accordance with the output of the encoder. During its passage through the medium the signal is changed by the addition of noise. In some cases the signal is changed in ways which can provide useful information. After the waves have traveled through the medium to a receiver 30 they are detected by a detector or transducer 32, processed by a matched filter or signal processor 34 and transformed by a decoder 36 into a form which is recognizable by an information destination 38.

It will be apparent from the foregoing brief description that neither the nature of the medium nor the nature of the waves to be transmitted is critical. For example, electromagnetic waves in a variety of frequency bands might be utilized as could sound waves in a liquid, solid or gaseous medium. For convenience, the invention will be described herein primarily with reference to low frequency seismic waves traveling through the earth, such as may be produced by the apparatus described in my Patent No. 3,282,371 entitled, "Method of and Apparatus for Generating Seismic Waves," and in co-pending application entitled, "Seismic Source," Ser. No. 382,304 now Patent No. 3,346,066 filed July 13, 1964, by Miller, Pound and Snodgrass and assigned to the assignee of the present invention. No unnecessary limitation of the invention is to be implied from this expedient. Sound waves in earth or water could be utilized as produced by the apparatus described in my co-pending application entitled, "Sound Source," Ser. No. 539,365 now Patent No. 3,373,841 filed Apr. 1, 1966, and assigned to the assignee of the present invention. In addition, conventional sound sources may be utilized if desired.

Regardless of the type of waves and the medium, the wave trains which are detected at the receiver are affected by noise, which may have much greater amplitude than the transmitted waves. In such a case, the received signal corresponding to a particular transmitted signal may have an appearance as shown in FIGURE 7. The effect of such noise which is added to the signal during its passage through the medium is much reduced by applying the received signal to an active electrical filter appropriately tuned to the frequencies of the transmitted wave trains. It is preferred in the present invention to utilize active electrical filters which operate in real time so that the processing time usually required with correlation techniques is eliminated. Two specific examples of such filters (illustrated in FIGURES 15 and 17) will be described hereinafter.

When wave trains of constant amplitude and frequency and of short duration are applied to such filters the envelope of the output of such filters gradually increases, reaching its maximum value with the last cycle of the detected train and thereafter gradually diminishing.

As illustrated, the transmitter 22 and receiver may be linked by connecting means 40 so that the signal actually transmitted may be known at the receiver. In some applications the critical information concerning the transmitted signal may be predetermined and known at the receiver so that the connecting means 40 may be eliminated from the system.

An important feature of the present invention is that each of the transmitted signals comprises a plurality of wave trains of substantial but limited duration and different respective frequencies and having first predetermined time relationships with one another. This type of signal is utilized to approximate a signal whose instantaneous frequency varies continuously. Portions of a typical transmitted signal wherein the wave trains immediately succeed one another in the order of increasing frequency are illustrated in FIGURE 2 in terms of amplitude versus time. A graph of the frequency versus time characteristics of the signal shown in FIGURE 2 is presented in FIGURE 3 along with a similar graph of the continuously varying frequency which it approximates. The amplitude versus frequency characteristic of one of the wave trains and of the entire signal are presented in FIGURES 4 and 5, respectively. These graphs will be explained in detail hereinafter. FIGURE 6 illustrates a continuous frequency variation over time of three different signals which the plurality of wave trains utilized herein may be used to approximate.

As previously suggested, after the signal has traveled through the medium 28 it is detected by the receiver 30 (shown in FIGURES 13 and 14) and processed in accordance with the invention. A received signal which includes a large proportion of noise is illustrated in FIGURE 7.

The signal processor 34 operates upon the received signal to produce a separate filtered wave train corresponding to each of the transmitted wave trains. The waveforms of four of such wave trains, which may be described as roughly triangular, after they have passed through such filters, is shown in FIGURE 8. However, these forms are shown for a noiseless condition to illustrate the invention with greater clarity, and further they are not to the same scale as the waveforms of FIGURE 2. Actual waveforms as are produced in a seismic operation are illustrated in FIGURE 9.

The filtered wave trains are then combined in second time relationships to produce a combined pulse which is concentrated in a time which is substantially shorter than the durations of the respective transmitted wave trains. The manner of combination of the filtered wave trains is such as to produce composite waveforms similar to that shown in FIGURE 10 for a noiseless condition and to that shown for an actual seismic operation in FIGURE 11. FIGURE 12 shows the idealized shape of the processed signals produced by transmitted signals having the frequency distributions shown in FIGURE 6. It may be seen that a substantial portion of the pulse occurs in a time substantially shorter than the respective durations of any one of the transmitted wave trains.

Since an important feature of the invention involves the transmission of a plurality of wave trains forming each transmitted signal and the processing and combination of the detection signals in the receiver 30 to produce a time-compressed pulse, the description of the operation of the invention begins with a discussion of the signal form. It will be apparent that an equally important feature of the invention is the signal processing system itself but this can best be understood after the nature of the signal is explained.

The signal

In general, each transmitted signal preferably comprises a plurality of wave trains of substantial but limited duration and usually of substantially equal duration (designated as $t_1$), each wave train having a different predetermined and substantially constant frequency. The wave trains or pulses, as stated above, have first time relationships with one another.

The transmitted signal is related in some way to an event produced by the event source as are the received wave trains and the combined signal. For example, in the seismic prospecting system described in the previously mentioned co-pending application Ser. No. 382,086, now Patent Number 3,363,229 of which this application is a continuation in part, the times of the last cycles of the various transmitted wave trains are related to a time reference datum. The times of receipt of the cycles corresponding to such transmitted cycles are also related to the time reference datum, as is the time of the combined signal. Comparison of these time relationships provides information about the travel time of the signal which may be used to derive information as to the distance of reflecting or refracting strata in the earth.

Similarly in other signalling systems utilized to obtain information, the transmitted signals may be applied to the medium with predetermined first time relationships. The differences between the first and second time relationships and between the composite signal produced and such a composite signal as produced by combining filtered wave trains corresponding to the applied wave trains may be utilized to obtain information which has been added to the signal during its passage through the medium. As another example, in a signalling system used for transmitting information the transmitted signals may be applied to the medium in accordance with a predetermined code, the variables of which are the first time relationships and the frequencies utilized. Changes in these variables affect in a determinable manner the characteristics of the composite pulses produced by the system such as their frequency spectrum, relative time, amplitude or polarity. Hence, these characteristics of the composite pulses are indicative of the information transmitted.

As shown in FIGURE 3, the transmitted signal may comprise a series of wave trains having a steplike progression of frequencies. The lines passing generally through the center of each step represents a signal of continuously varying frequency. A signal whose frequency varies with time along this line would be approximated by the illustrated single frequency wave trains yet the single frequency wave trains actually utilized can be processed utilizing relatively simple equipment as will be seen hereinafter. Conversely the equation of such a line as that illustrated may be used to describe the distribution in time of the various frequencies of the separate wave trains. Thus one could speak of a linear distribution of frequencies if all the wave trains were of equal duration and spaced equally from one another in frequency. Similarly, a logarithmic or exponential distribution of frequencies could be employed.

Three exemplary distributions of frequency over time which might be utilized in the invention are illustrated in FIGURE 6. In each case frequency increases monotonically. The line A shows a linear distribution. Line B is concave downwardly, i.e., the slope of the curve decreases monotonically. Line C however is concave upwardly, i.e., the slope of the curve increases monotonically.

Thus far the description of the transmitted signal has been confined to wave trains which immediately succeed one another and whose frequencies are monotonically increasing functions of time, i.e., frequency never decreases. Similarly the signal approximated by the actual wave trains has been one which increases monotonically over time. However, it should be apparent that this specific set of first time relationships in which the actual wave trains are transmitted may be varied considerably, since such variations would not effect the amplitude versus frequency characteristic of the signal or the signal approximated. Thus the order of transmission could be reversed, or any other order could be followed or the wave trains could overlap, all of which would be equivalent to an order of transmission in which frequency always increases. Such a transmitted signal would nevertheless approximate a signal with a continuously varying frequency which always increases. For convenience, however, reference will be made herein to a monotonically increasing frequency distribution and neighboring frequencies therein which are placed in the order of increasing frequency, the understanding being that once the frequencies and wave train durations are selected which approximate a particular signal with a continuously changing frequency, the order of actual transmission may be changed. It will be seen, however, that the time relationships in which the filtered wave trains are combined at the receiver will be required to be correspondingly altered to reflect changes in times of transmission.

Instead of describing the variation of the signal amplitude as a function of time, one may describe the signal amplitude as a function of frequency utilizing the Fourier transform. Thus if the wave amplitude as a function of time is $g(t)$, the amplitude as a function of frequency is designated as $G(j2\pi f)$. The Fourier transform is:

(1) $$G(j2\pi f) = \int_0^\infty g(t)e^{-j2\pi ft}dt$$

and the inverse transform is:

(2) $$g(t) = \frac{1}{2\pi}\int_{-\infty}^\infty G(j2\pi f)e^{j2\pi ft}d(2\pi f)$$

Hence if either $g(t)$ is determined for all values of $t$ or $G(j2\pi f)$ is determined for all values of $f$ the other function is uniquely determined. While $g(t)$ must be a real function of time, the Fourier transform $G(j2\pi f)$ is in general complex. It is conventional, however, to consider only the amplitude function $|G(j2\pi f)|$ which determines the shape of the processed signal and ignore the phase behavior which is associated with the time of the processed signal.

The general shape of the absolute value of $G(j2\pi f)$ for a typical one of the transmitted wave trains is illustrated in FIGURE 4. This function it will be observed has a zero condition designated as D, a central peak designated as E and a later zero value designated as F. In order for the different wave trains to approximate a continuously varying signal the peak E of one wave train is preferred to coincide substantially with the zero condition D of the next wave train, while the zero condition F of the first wave train should correspond to the peak E of the next wave train. This is equivalent to saying that:

(3) $$\frac{(f_{i+1}-f_i)(t_{i+1}+t_i)}{2} = M$$

where M is any integer and $t$ refers to the duration of respective transmitted wave trains. Superimposing the amplitude frequency distributions as shown in FIGURE 4 of the wave trains illustrated in FIGURES 2 and 3 on one another results in the amplitude versus frequency characteristics illustrated on a reduced scale in FIGURE 5. Either the duration of the wave trains or their amplitude may be varied to produce the distribution of energy shown in FIGURE 5; however, it is usually preferred, especially where seismic waves are utilized, to maintain the amplitude constant and vary the wave train durations. Similarly the maximum amplitude of the approximated signal could also vary with time and with frequency but where such signals are actually used a uniform maximum amplitude is common.

Ordinarily in determining the exact frequencies and wave train durations, one first determines the range and the characteristics of the continuously varying frequency which one wishes to approximate, which may be described as $f(t)$ if a uniform maximum amplitude is used. Then it is decided how many wave trains will be utilized. This number may be designated as N. It appears that about six wave trains are the practical minimum for effective approximation of a signal having a continuously varying frequency. As many as thirty wave trains may be utilized in conjunction with existing multiple track recorders at the receiver. In general, the number may be made as small as the square root of the product of the total signal duration and the difference between the highest and lowest frequencies, i.e., $\sqrt{(f_{max.}-f_{min.})T}$. The durations of the wave trains will be approximately equal to the total signal time T divided by the number of wave trains N. The durations are not exactly this value in practice since it is often convenient for each wave train to be produced with an integral number of cycles. The equation for the continuously varying frequency may then be utilized in conjunction with successive selections of the exact wave train frequencies and the durations thereof which give an integral number of cycles to each wave train to determine the time, duration and frequency of the respective wave trains which approximate the continuously varying frequency.

An example of such a determination of a set of wave train frequencies and durations is as follows. The continuously varying signal which it is desired to approximate is that which on a graph of frequency versus time has the form of an upwardly concave parabola. The signal has a total duration T of 10 seconds, beginning at $t=-T/2$ and frequency sweep between 30 cycles per second and 70 cycles per second. The frequency at $t=0$ is a fraction K of the mean frequency, which fraction determines the shape of the parabola. Preferably K is between .86 and .96 so that the frequency at $t=0$ is between 43 and 48 cycles per second.

The general equation is:

(4)
$$\left(\frac{K(f_{max.}+f_{min.})}{2}+\frac{(f_{max.}-f_{min.})t}{T}+\frac{2(f_{max.}+f_{min.})t^2(1-K)}{T^2}\right)$$

$$R(t)=\{\sin(2\pi f_i t)\}e^{\frac{k't}{t_i}}$$

If K is selected to be .90 so that the frequency at $t=0$ is 45 cycles per second the equation reduces to:

(5) $\quad f(t)=45+4t+0.2t^2$

The number of wave trans N may be chosen to be $20(\sqrt{(f_{max.}-f_{min.})T}=\sqrt{(70-30)\times 10}=20)$. The approximate duration of each of the wave trains is $T/N$ or 0.5 second. The center of the eleventh wave train is set to occur at $t=0$ and to have the value of the continuously varying frequency at that time, i.e., 45 cycles per second. The number of cycles at this frequency which results in a duration closest to 0.5 second is 22 and the duration of the eleventh wave train is 0.489 second. The difference in time between the center of the eleventh wave train and the twelfth wave train may be taken to be 0.500 second for substitution in Equation 5, so that $F_{12}=27.0$ cycles per second. The integral number of cycles at this frequency which results in a duration closest to 0.5 second is 23 and the duration of the twelfth wave train is 0.488 second. The time of the center of the thirteenth wave train may then be taken as 0.500 second+.488 second for substitution in Equation 5. A similar process is performed for the wave trains occurring before $t=0$. The result is shown in the following table:

| Wave train No. | Frequency (c.p.s.) | Center time | Number of cycles | Duration |
|---|---|---|---|---|
| 1 | 29.6 | −5.03 | 20 | .676 |
| 2 | 31.0 | −4.49 | 20 | .645 |
| 3 | 32.5 | −3.87 | 20 | .615 |
| 4 | 34.1 | −3.24 | 21 | .616 |
| 5 | 35.7 | −2.68 | 20 | .560 |
| 6 | 37.5 | −2.10 | 22 | .587 |
| 7 | 39.2 | −1.56 | 21 | .536 |
| 8 | 41.2 | −1.00 | 23 | .558 |
| 9 | 43.0 | −.50 | 22 | .512 |
| 10 | 45.0 | 0 | 22 | .489 |
| 11 | 47.0 | .50 | 23 | .489 |
| 12 | 49.1 | .99 | 23 | .468 |
| 13 | 51.2 | 1.46 | 24 | .469 |
| 14 | 53.4 | 1.93 | 24 | .449 |
| 15 | 55.6 | 2.38 | 25 | .450 |
| 16 | 57.9 | 2.83 | 25 | .432 |
| 17 | 60.1 | 3.26 | 27 | .449 |
| 18 | 62.5 | 3.71 | 26 | .416 |
| 19 | 64.8 | 4.13 | 28 | .432 |
| 20 | 69.7 | 4.96 | 29 | .416 |

Regardless of the exact form of transmitted signal the received signal which is detected after the wave trains have passed through the medium is processed by a matched filter. Specifically it is passed through the previously mentioned active filter to reduce noise and produce the filtered wave trains with roughly triangular envelopes previously described. These filtered wave trains are then combined with one another in second time relationships. Preferably, these second time relationships are such that the filtered wave trains will be in phase and all reach a peak more or less simultaneously during a particular half cycle of such detection signals. More particularly, the peaks selected to be placed in phase are those corresponding to the last transmitted cycle of each wave train. Such peaks are therefore also at the peak of the envelope of the filter output. The filtered wave trains thus all add to each other at this time and tend to cancel one another out at other times. The resulting composite signal has a substantial portion of its energy concentrated in a time which is shorter than any of the transmitted wave trains. It has a recognizable peak and is similar in form to the so-called Ricker wavelet, as produced by correlation of a received signal with a transmitted signal, but clearly differs in the way it is produced.

Figure 11:
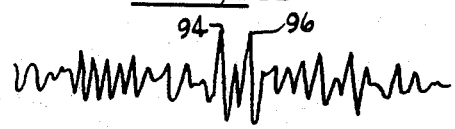
FIGURE 11 is an illustration of the actual combined signal as produced by combining the actual waveforms of FIGURE 10.
Figure 12:
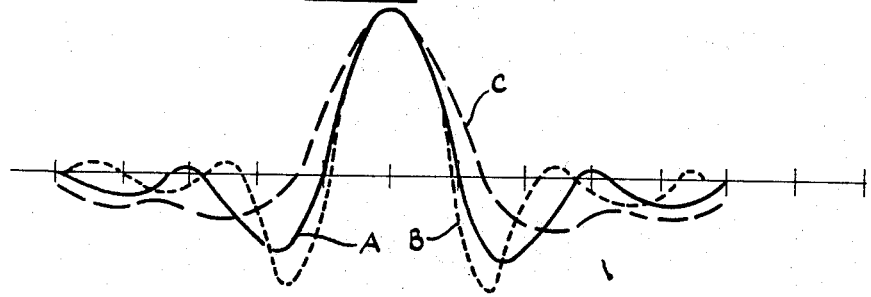
FIGURE 12 illustrates for noiseless conditions the processed received signals corresponding to each of the signal distributions illustrated in FIGURE 6.

A typical actual combintd signal produced in a seismic prospecting operation from the filtered wave trains shown in FIGURE 9 is illustrated in FIGURE 11. Similarly FIGURE 12 shows a combined signal produced by combining idealized waveforms such as those of FIGURE 10.

The exact shape of the combined signal depends upon the frequency distribution of the transmitted signal. This may be seen in FIGURE 12 which shows three combined signals produced by transmitted waves having the distributions illustrated in FIGURE 6. The combined waveforms and corresponding frequency distributions are similarly labeled in the two figures. It may be seen that frequency distribution B which is concave downwardly produces a combined signal which has a relatively narrow central peak but also has secondary maxima or side lobes which are relatively large. Conversely frequency distribution C produces a combined signal with lower side lobes but a broader and less concentrated central peak. The selection of the proper frequency distribution, of course, depends upon the use to be made of the signal. If the exact time of the combined signal is important, for example, frequency distribution B producing a narrow central peak would be preferred. It might seem that a preferable distribution for most purposes would be the linear distribution which does not have the extreme features of either frequency set C or set B. This, however, is not the case since a constant frequency difference between adjacent frequencies (designated herein as $\Delta f$) results in large, spurious peaks located at times which are $1/\Delta f$ before and after the main peak.

The combined signal with a recognizable peak is seen to be particularly well suited to use of a binary code wherein the presence of a pulse signal represents one state and the absence of a signal or the presence of a pulse signal of opposite polarity represents the other state. Alternatively, the peak of the wavelet may be located on a time scale with great precision and hence time coding of a plurality of such signals is feasible. The position on a time scale of the sharp peak corresponds to the times of the final half cycles of the transmitted wave trains. Furthermore, the amplitude of the composite signal or its polarity, i.e., whether it is positive or negative, may be predetermined, and coding on this basis is also feasible. All of these features clearly may be useful in a communication system. Location of the wavelet peak with precision on a time scale is, of course, quite useful in seismic prospecting where determination of signal travel time is important.

In such a form of signalling system used to obtain information the second time relationship in which the filtered wave trains are combined is the time relationship where the peak signals of all of the respective received and filtered signals would coincide in time if the detector were responding to the applied waves directly without their transmission through the medium. This is achieved by proper relationship of the encoder 24 and processer 34 so that each applied wave train terminates in a final wave at the proper time in the operational cycle of the system, that is, at a particular time after a reference datum for the processer 34. If the final cycle of each transmitted wave train occurs at the proper time interval after the reference time for each wave train and the reference data for all filtered wave trains are made to coincide, the filtered wave trains at the various frequencies will all be substantially in phase at the time corresponding to the receipt of the final cycle of their respective transmitted wave trains.

It may be seen that in such a system the time and waveform of the composite signal produced and especially the difference between such a waveform and one which would be produced if the signal had not passed through the medium may be indicative of changes in the signal occasioned by its passage through the medium and hence of information about the medium or structures therein. In most instances, however, these changes are not so great as to prevent formation of a recognizable composite signal. On the other hand, the second time relationships may be adjusted so as to cause a close correspondence of the composite signal to those illustrated and in this event the second timt relationships are also indicative of changes in the signal occasioned by the passage through the medium. If however such changes are previously known, the knowledge may be used to introduce compensating changes of phase and amplitude in the manner of combining the filtered wave trains. This process is generally know as inevrse filtering and is applicable whenever the additional time delays introduced by reverberation in the medium itself are small in comparison with the duration of the individual wave trains.

The matched filter and the signalling method described herein are not confined to use with any particular type of wave trains or media. Regardless of the nature of the medium, types of waves or wave sources employed, after the wave trains have traveled through the medium to the location of the receiver 30 they are detected as has been previously noted. If seismic waves or sound waves in water are utilized, the receiver 30 may include as a detector 32 a conventional geophone or hydrophone which receives seismic or sound waves and produces corresponding electrical signals, which signals are operated upon or processed in the matched filter or signal processer 34 included in the receiver 30 and may be recorded by a recording system 44 prior to decoding by the decoder 36. The matched filter now to be described includes the active filter means previously mentioned.

The matched filter

Figure 14:
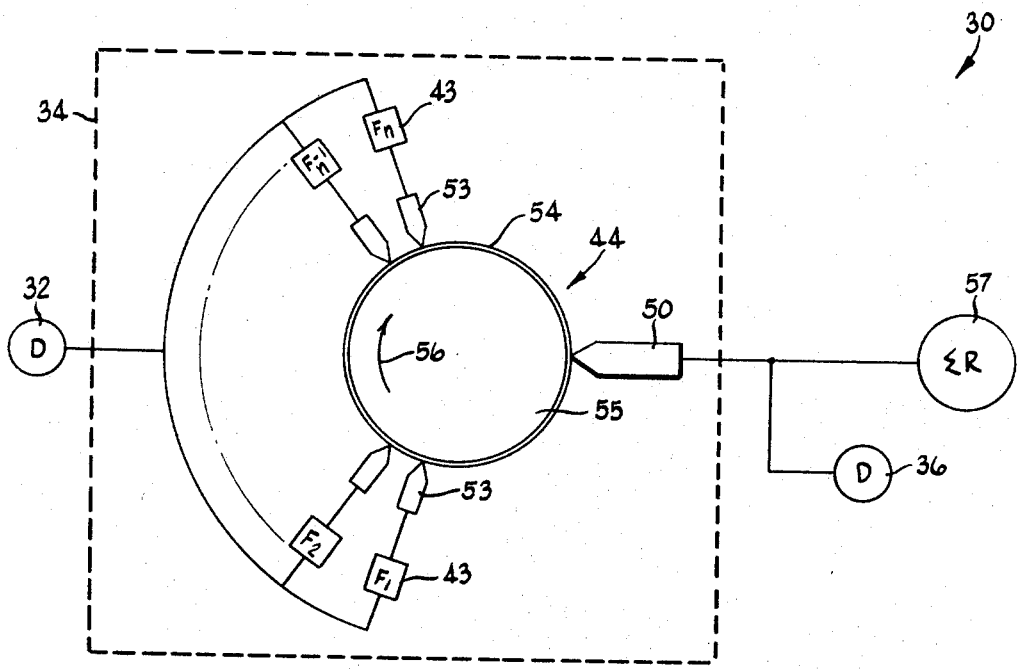
FIGURE 14 is a diagrammatic illustration of another signal processing system useful in certain applications and illustrating various features of the invention.

In FIGURES 13 and 14 are shown diagrams of two forms of the receiver 30. In both forms the electrical signal produced by a detector 32 in response to the reflected waves is applied to the matched filter 34 and specifically to an active filter 43 narrowly tuned to pass waves of the frequency transmitted by the sources for the particular wave train being detected. The signal passed by the filter 43 is then recorded on a corresponding recorder 44. The receiver 30 shown in FIGURE 13 is connected to the transmitter 22 by the connecting means 40 so that the characteristics of the transmitted signal are known a the receiver. The receiver 30 shown in FIGURE 14 is not connected to the transmitter and the signal characteristics are predetermined.

The receiver of FIGURE 13 is especially useful where the wave trains are successively transmitted rather than overlapping in time and in a seismic prospecting system where it is desired that the record made on recorder 44 be related to the time of travel of the waves from the seismic sources. To accomplish this the recorder cycle is related to the control system either by having the control 24 start the recorder time or by having the recorder operation cyclical, as by using a rotating magnetic drum recorder and starting the operation of the control circuit at a particular time in the recorder cycle, for example, by using a microswitch at a particular point on the drum of a recorder. It is also possible to have an auxiliary receiver station adjacent the transmitter 22 to measure the time of initiation of the signals and to utilize the output of this receiver to time the recorder. In any event, in some convenient and conventional manner, the time of the record made upon the recorder 44 may be related to the initiation of the transmitted signal and thus provide a record of received waves as a function of time with the time of energization of the transmitter as a reference datum. For each frequency as controlled by the control system 24 a frequency control switch 45 switches components in the filter 43 to tune the filter to that frequency. At the same time, the frequency control switch is ganged by a shaft 46 to a switch 48 which functions to switch the output of the filter 43 to a recorder 44 which then records the signal for the respective selected frequency. The results is that the reflected signal at each frequency is recorded on a respective recorder 44. In an operational embodiment, each recorder 44 may be a separate track on a single magnetic recording drum.

Inasmuch as each record is a measure of the detected wave as a function of time and may be related to a reference datum, e.g., the time of the energization of the transmitter at a respective frequency, the records may be arranged so that the reference data coincide, and the records then combined. The records as recorded on each of the recorders 44 are combined by a read out device 50, which may be a single pick up head covering all the recording tracks of the drum of a single recorder, and the combined signal is then recorded as a function of time upon a summed signal recorder 52.

The receiver shown in FIGURE 14 is especially useful in applications where the wave trains are transmitted overlapping in time or where, if transmitted successively, due to multiple transmission paths through the medium, they overlap in time when received. In this receiver the waves in the medium are detected by a detector 32 which converts them into electrical output signals. The electrical output signals produced by the detector 32 in response to the wave trains are applied to a plurality of narrow band-pass electrical filter 43 arranged in parallel, each of which is pretuned to one of the transmitted frequencies. Thus different wave trains received in overlapping time relationship are distinguished and separated from one another. The output of each filter 43 is applied by a respective recording head 53 to the recorder 44 comprising a record medium 54; such as, for example, magnetic tape mounted on a drum 55 rotating in the direction of the arrow 56.

The recording heads 53 are located at selected points axially and circumferentially spaced aong the surface of the recording drum 55, which rotates at a predetermined velocity. The result of the axial spacing is that the detection signal produced by each filter 43 is recorded on a separate parallel track of the record medium 54. Records of signals produced on the respective recording tracks by the recording heads 53 may then be combined by the read-out device 50. The read-out device 50 may be, as shown, a single pickup head covering all the recording tracks whereby the recorded detection signals are combined. In this event the relative circumferential spacing of the recording heads 53 and the velocity of rotation and size of the recording drum 55 determine the time relationship in which the detection signals are combined.

Alternatively, a plurality of pickup heads spaced axially and circumferentially along the surface of the recording drum 55 with one on each track may be utilized and their outputs combined electronically in which case the circumferential spacing of the pickup heads will also effect the time relationships in which the wave trains are combined. In any event, the read-out device 50 preferably includes an integrating amplifier so that the output thereof is proportional to magnetic flux rather than to the time rate of change of flux, as is true for ordinary reading heads. The combined signal produced by the read-out device 50 is the output signal of the matched filter 34. It may be recorded on a combined signal recorder 57 for later recording, or may be applied directly to the decoder 36. Both connections are shown in FIGURE 14.

It has been found preferable to utilize as a filter a so-called operational filter in the form of a narrow band pass active filter having adjustable frequency and Q controls. The filter is based upon the analog simulation of the differential equation of a damped linear oscillator that is excited by an input signal of the resonant frequency. The frequency and Q controls are adjusted to provide a filter response approximating the correlation function for the particular transmitted wave train frequency and length. This response for four wave trains for an idealized noiseless condition may be seen in FIGURE 6. It may be seen that the filter output in response to each of the transmitted wave trains rises substantially to its steady state over a time equal to the duration of the transmitted wave train and over the same time falls to about one-fourth its maximum amplitude. The impulse response of the filter approximates the transmitted wave train to which it is tuned. These characteristics may be stated mathematically by the equation:

$$R(t) = \{\sin(2\pi f_i t)\} e^{-\frac{k't}{t_i}}$$

where $R(t)$ is the impulse response, $t$ is time, $f_i$ is the frequency of a respective transmitted wave train, $t_i$ is the duration of the transmitted wave train with frequency $f_i$, and $k'$ is a dimensionless constant of approximate value 1.4. The differential equation is:

(6) $$\frac{d^2x}{dt^2} + \frac{\omega dx}{Q dt} + \omega^2 x = \omega^2 F(t)$$

where $F(t)$ is the input function which represents a received signal characterized by the effective resonant filter frequency mixed with varying amounts of noise. This converts to (7) $$\frac{1}{\omega}\frac{d^2x}{dt^2} = [F(t) - x]\omega - \frac{1}{Q}\frac{dx}{dt}$$

which can be set up in analog form as in FIGURE 15.

It should be noted that $\omega$ for 100 c.p.s. signals would be 628 while a coefficient potentiometer yields a number only from 0 to 1. For this reason the $\omega$ setting is really $\omega/1000$ and both such settings are followed by integrators with a gain of 1000 to compensate. This also keeps the integration capacitors from being excessively large.

The basic schematic of such a filter is preferably as shown in FIGURE 16. The filter includes amplifiers 58, 60, 62 and 64. Amplifiers 58, 60 and 62 may be small conventional operational amplifiers having a frequency response of 0 to 10 kilocycles. Amplifier 64 may be a symmetrical emitter follower to provide a low impedance output. Amplifier 58 is part of a summing amplifier 66 to which an input signal is applied at each of input resistors 68 and 70 and which includes a feedback resistor 72. Potentiometer 74 is a frequency control coupled between the output of summing amplifier 66 and an integrating amplifier 76 comprising input resistors 78 and 80, amplifier 60 and a feedback capacitor 82. The output of the amplifier 76 is applied to another potentiometer 84 which acts as a frequency control. The output from the frequency control potentiometer 84 is applied to a potentiometer 86 which acts as a Q control. The output of the potentiometer 84 is also applied to an input resistor 88 which is part of an integrator 90, which also includes amplifiers 62 and 64 and a feedback capacitor 92. The signal from the Q control 86 is applied to resistor 80 at integrator 76. The output of the integrator 90 is then the filter output passed to a recorder 50. It is also fed back to the input resistor 70 of the amplifier 66.

The operation of the amplifier may be readily understood by reference to FIGURE 15 which is a functional illustration of the filter. The operational filter is normally adjusted so that the buildup of the filter output over the duration of a single idealized reflection signal and the ringing decay of the filter after the cessation of the signal form a roughly triangular envelope as is illustrated by the wave forms shown in FIGURE 8. Amplifier 66 sums its input signals $-F(t)$ and $x$ and inverts the sum to produce a signal $F(t) - x$. Potentiometer 74 (with appropriate amplifier gain) multiples the sum by $\omega$ to produce a signal $[F(t) - x]\omega$. Integrator 76 adds this signal to a signal representative of $$-\frac{1}{Q}\frac{dx}{dt}$$

to produce a signal $$[F(t) - x]\omega - \frac{1}{Q}\frac{dx}{dt}$$

which as noted above is equal to $$\frac{1}{\omega}\frac{d^2x}{dt^2}$$

integrator 76 then integrates this to produce a signal $$-\frac{1}{\omega}\frac{dx}{dt}$$

which is multiplied by $\omega$ by potentiometer 84 (with appropriate amplifier gain) to produce a signal representative of $$-\frac{dx}{dt}$$

This signal is multiplied by $1/Q$ by the Q control potentiometer 86 to provide an input signal for integrator 76. It is also integrated to produce the signal $x$ which is the filter output and also an input signal to amplifier 66.

The filter 43 is tuned by the adjustment of potentiometers 74 and 84. The adjustment may be made by movement of the frequency control switch 45 to provide the appropriate frequencies, or the switch may switch different preset components for potentiometers 74 and 84, the components being preset to provide the predetermined frequencies. The Q control 86 may be similarly adjusted.

The operational filter as described in connection with FIGURES 15 and 16 features independent frequency and Q controls. However, in the case of a signalling system utilizing sets of frequencies and numbers of cycles such that all wave trains used are of approximately equal time duration, it is desirable to use a filter wherein the Q control is proportional to frequency while the frequency control is independent of Q. This can be accomplished by the filter shown in FIGURE 17.

Figure 17:
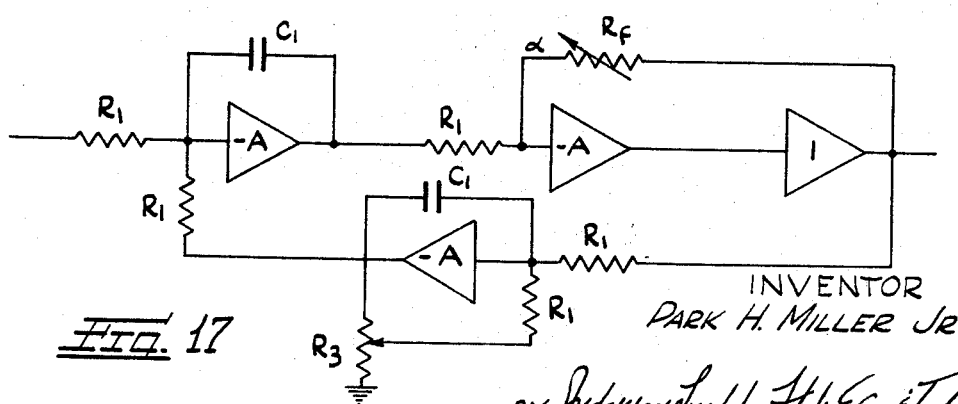
FIGURE 17 is a diagrammatic illustration of another embodiment of a filter useful in the system shown in FIGURES 13 and 14.

A filter like that shown in FIGURE 17 is described in an article by F. T. May and R. A. Dandl, "Active Filter Element and Its Application to a Fourier Comb," Review of Scientific Instruments, April 1961, volume 32, No. 4, page 387. This circuit requires only a single frequency control rather than the dual frequency control of the filter of FIGURES 15 and 16 and provides the desired frequency dependence in the Q control. The bandwidth and gain of this circuit are substantially identical to those of the circuit shown in FIGURES 15 and 16. The pertinent relations are as follows:

resonance frequency $= \alpha^{1/2}/2\sqrt{R_1 C_1}$
$Q = \alpha^{1/2}/f$
$\alpha = R_f/R_1$
$\gamma =$ Ratio on $R_3$
Bandwidth on long wave train $= \gamma/R_1 C_1$
Gain at resonance frequency on long wave train $= \alpha/\gamma$.

The Q, controlled by $\gamma$, need only be set once for a particular time length of pulse train, and the only control requiring switching during seismic work is the single frequency control $\alpha$. Thus, the control $\gamma$ can be adjusted to provide the desired Q, at a particular frequency for a wave train of the length being used, to produce the desired rate of rise and fall in the filter output. This setting of the control $\gamma$ then provides the desired Q for all other freqeuncies as determined by the control $\alpha$, the Q being also determined by the control $\gamma$ and hence being frequency dependent. This produces a Q that increases with frequency, which is desirable in seismic work in view of the normal increased attenuation of the higher frequencies in the transmission of seismic waves.

The filter shown in FIGURE 17 is particularly adaptable to switching elements in a filter 43, for only the switching of a single element, i.e., $R_f$, is required. That is, the frequency control switch 45 simply switches in different values of $R_f$ to change the frequency of the filter, at the same time being ganged to switch 48 to connect the filter to a different recorder 44 which in practice may be a different channel or track of a multitrack recorder.

Regardless of the exact method by which the filtered wave trains are produced they are then combined in second time relationships to produce the pulse occurring in a time substantially shorter than the durations of the transmitted wave trains as previously described and illustrated in FIGURES 10, 11 and 12. Generally this time relationship is that of the cycles of the filtered wave trains corresponding to selected cycles of the transmitted wave trains preferably the last cycle. More specifically such cycles are placed in the time relationship where they would be all substantially in phase at the peaks of cycles of like polarity if the filtered wave trains had been produced from a received signal which had not passed through the medium. In other words the filtered wave trains for all frequencies are combined in the time relationship wherein filtered wave trains corresponding to the applied transmitted wave trains without passage through the medium are all substantially in phase during one cycle of each, more particularly, in phase at the peak of the cycle corresponding to the peak of the last cycle of each applied wave train. The "time relationship wherein filtered wave trains corresponding to the applied wave trains without passage through the medium are in phase during one cycle of each" means and includes the relationship wherein all of the phase shifts in the system itself are taken into account but excluding the phase shifts occasioned by the passage of the waves through the medium. This is the time relationship where the peak signals of all of the respective signals recorded on the recorders 44 coincide in time when the detector is responding to the applied waves directly without their transmission through the medium. This is achieved by proper setting of the control system so that each applied wave train terminates in a final wave at the proper time in the operational cycle of the system, that is, at a particular time after a reference datum or reference time. This reference datum is the reference datum for the records 44, and if the final cycle of each pulse train occurs at the proper time interval after the reference datum for each frequency and the reference data for the records made by all of the recorders 44 are made to coincide, the filtered waves at the various frequencies will all be in phase at the time corresponding to the receipt of the final cycle of the respective applied wave trains from the various reflectors.

The records made by the respective recorders 44 are made with coinciding reference data. This may be achieved by suitable programming of the master control system. This setting of the control system may be readily achieved in advance of actual operations by utilizing a test receiver at the transmitter 22. The time relationship of the combined signal and the reference datum is indicative of signal travel time.

A practical example of the technique is illustrated in FIGURES 9 and 11. All of the traces in FIGURE 9 were taken directly from actual seismic field records. In this particular operation, six frequencies were used at 90, 79, 68, 57, 46 and 35 cycles per second, respectively. The records as made on respective recorders 44 are shown as traces A, B, C, D, E and F, respectively. Each of these records was made through a narrow band filter 43 which was switched to be tuned to the respective frequency. The records made on recorders 44 are normally in the form of magnetic records. However, they are shown in FIGURE 9 as retranscribed on a recording oscillograph. A plurality of filters in parallel arrangement could of course also have been utilized.

The summation of signals, A, B, C, D, E and F by the readout device 50 as recorded on summation recorder 52 is shown as the trace in FIGURE 11. Two reflectors are evident in the region around one second of travel time away from the receiver, the reflectors being identified as peaks 94 and 96 on the trace.

These actual traces and the summation record as shown in FIGURES 9 and 11, graphically illustrate the effect of the matched filter method and system. It is evident that none of traces A, B, C, D, E and F by itself clearly delineates the positions of the reflecting strata. However, the summation record in FIGURE 11 clearly identifies reflecting strata in much the same way as they are identified on conventional seismograms. The characteristic wavelet indicating a reflecting stratum is known as the reflection signature of that stratum. Inasmuch as the summation record looks very much like conventional seismic records, it may be interpreted following conventional seismic techniques. However, the manner in which the seismic record is made provides emphasis of certain reflecting strata under conditions where conventional seismic techniques have failed. In particular, it is shown how reflecting surfaces lying very closely together may be differentiated, as compared with the relatively long, undifferentiated pulse trains in the monochromatic records of FIGURE 9.

The following criteria are important for good signature generation:

(1) A high average frequency should be used to obtain a high resolution signature; that is, the higher the frequency used, the sharper the main peak of the summation record. The frequency, however, is limited by the physics of the source and the medium. The higher frequencies are difficult to radiate and transmit with efficiency.

(2) A wide range of frequencies should be employed, ranging from the highest to the lowest values at which good radiation and transmission efficiency are achieved. A wide range is desirable for minimizing the side lobes.

(3) A large number of different frequencies is desirable for the general reduction of secondary peaks or side lobes. The number selected should be consistent with economic field equipment and operation costs. With a set of fixed frequencies made readily available by programming or easy switch selection, the shooting of a number of different frequencies should occupy essentially no more time than shooting the same number of shots at a smaller number of frequencies. A large number of frequencies would have the basic advantage of providing a nearly continuous range of fixed, but closely spaced, frequency wave trains. Dropping out one, or even a few frequencies to avoid particular interfering peaked noises would be possible without too deleterious an effect on the signature. Additional frequency units at either end of the main distribution would enable a selection of the frequency range to fit the particular field condition.

(4) Generating operational filter outputs of roughly the same amplitude is desirable to achieve a uniform representation of all frequencies in the signature. Constant amplitude outputs may be achieved either by gain adjustments, or by multiple shooting where particular frequencies are transmitted with high attenuation. The use of a filter having a Q that increases with frequency, e.g., the filter shown in FIGURE 16, helps keep up the amplitude of the normally more attenuated signals at the higher frequencies.

(5) The frequencies should be selected so that the detected wave trains can be in phase with each other substantially only during one cycle thereof, in particular during the cycle corresponding to the last cycle of the respective applied wave train.

(6) The frequencies should be selected to avoid ambient noise frequencies.

Actual preferred distributions of frequencies have been discussed above in detail.

It would be possible to utilize more than one of these distributions and transmit and receive a plurality of signals overlapping in time which would be distinguishable from one another after processing by the matched filter.

It may be seen that the equipment utilized may be much simpler and less expensive than with matched filters utilizing signals of continuously varying frequency. Indeed it appears that whereas in a system utilizing multiple taps on a delay line the number of taps generally required is the product of the total signal time and the difference between the highest and lowest frequencies, in the present system the number of wave trains and filters utilized need be only about the square root of that product.

Various changes and modifications may be made in the above described signalling system and method all of which would fall within the spirit and scope of the invention. For example, although the transmitted, received and processed signals have been illustrated as continuous functions, it would be possible to convert the received signal or the filtered wave trains or the compressed signal from analog to digital form if this is advantageous.

Various features of the invention are set forth in the accompanying claims.

I claim:

1. A matched filter for processing a received signal resulting from a transmitted signal, said transmitted signal being related to an event and having the form of a plurality of wave trains each with a different respective substantially constant frequency and a substantial limited duration and having first predetermined time relationships with one another relative to a selected cycle of each transmitted wave train, said matched filter acting to produce a pulse related to said event and having a duration substantially shorter than the respective durations of said transmitted wave trains, said matched filter comprising active filter means tuned to the respective frequencies of said transmitted wave trains for producing from said received signal a separate filtered wave train corresponding to each of said transmitted wave trains and having a cycle corresponding to said selected cycle of the corresponding transmitted wave train and means for combining said filtered wave trains in second time relationships with the cycles of said separate filtered wave trains corresponding to said selected cycles of corresponding transmitted wave trains in phase with one another to produce said pulse.

2. A matched filter according to claim 1 wherein said active filter means comprises a plurality of narrow band-pass active filter means each tuned to a respective one of the frequencies of said transmitted wave trains.

3. A matched filter according to claim 1 wherein said active filter means comprises a narrow band-pass active filter and means for tuning said filter to each of the frequencies of said transmitted wave trains.

4. A matched filter according to claim 1 wherein said active filter means includes means for adjusting the Q of said filter.

5. A matched filter according to claim 1 wherein said active filter means has a Q at each of the frequencies of said respective transmitted wave trains such that the filter response approximates the correlation function of the respective transmitted wave train.

6. A matched filter according to claim 1 wherein said active filter means has a Q at each of the frequencies of said respective transmitted wave trains such that the filter output in response to each of said respective transmitted wave trains rises substantially to its steady state over a time equal to the duration of said respective transmitted wave train and falls to about one fourth its maximum amplitude over a time equal to the duration of said respective transmitted wave train.

7. A matched filter according to claim 1 wherein said active filter means has a Q at each of the frequencies of said respective transmitted wave trains such that the impulse response of said filter approximates the respective transmitted wave train.

8. A matched filter according to claim 1 for processing said received signal resulting from a respective transmitted signal in which the durations of said transmitted wave trains are substantially equal, wherein said active filter means has a Q at each of the frequencies of said respective transmitted wave trains directly proportional to the frequency of said respective transmitted wave trains.

9. A matched filter according to claim 1 wherein said means for combining said filtered wave trains comprises a movable record medium having a plurality of parallel tracks, recording means for recording said filtered wave trains on respective ones of said tracks, means for adjusting the positions of said recording means whereby said second time relationships are adjusted, and readout means for detecting simultaneously the wave trains recorded on said tracks.

10. A method of processing a received signal resulting from a transmitted signal, said transmitted signal being related to an event and having the form of a plurality of wave trains each with a different respective substantially constant frequency and a substantial limited duration and having first predetermined time relationships with one another relative to a selected cycle of each transmitted wave train, to produce a pulse related to said event, said method comprising applying said received signal to narrow band pass active filter means tuned to the respective frequencies of said transmitted wave trains, producing a separate filtered wave train corresponding to each of said transmitted wave trains and having a cycle corresponding to said selected cycle of the corresponding transmitted wave train, and combining said filtered wave trains in second time relationships with the cycles of said separate filtered wave trains corresponding to said selected cycles of corresponding transmitted wave trains in phase with one another to produce said pulse, said pulse having a duration substantially shorter than the respective durations of said transmitted wave trains.

11. A method of signalling between a transmitter and a receiver in a medium, said method comprising applying a transmitted signal to the medium, said transmitted signal being related to an event and comprising a plurality of wave trains, each of said wave trains being transmitted at a different respective substantially constant frequency for a substantial limited duration, said transmitted wave trains having first predetermined time relationships with one another relative to a selected cycle of each transmitted wave train, receiving said signal after it has traveled from the transmitter to the receiver, applying said received signal to active filter means tuned to the respective frequencies of said transmitted wave trains to produce a separate filtered wave train corresponding to each of said transmitted wave trains and having a cycle corresponding to said selected cycle of the corresponding transmitted wave train, and combining said filtered wave trains in second time relationships with the cycles of said separate filtered wave trains corresponding to said selected cycles of the corresponding transmitted wave trains in phase with one another to produce a combined pulse related to said event having a duration substantially shorter than the respective durations of said transmitted wave trains.

12. A method of signalling in accordance with claim 11 wherein said second time relationships are such that the separate filtered wave trains which would have been produced from said received signal, if said received signal had not passed through the medium, would be substantially all in phase near the peaks of like polarity of the respective cycles of said separate filtered wave trains corresponding to said selected cycles of said transmitted wave trains.

13. A method of signalling in accordance with claim 11 wherein said first time relationships and said frequencies of said transmitted wave trains are such that each of said separate filtered wave trains is substantially unaffected by transmitted wave trains other than the one to which said separate filtered wave train corresponds.

14. A method of signalling in accordance with claim 11 including applying said received signal to a plurality of narrow band pass active filters each tuned to the frequency of a respective one of said transmitted wave trains.

15. A method of signalling in accordance with claim 11 including selectively tuning said filter means to the respective frequencies of said transmitted wave trains and selectively adjusting the Q of said filter means so that the filter response approximates the correlation function of the respective transmitted wave train to which said filter is tuned.

16. A method of signalling in accordance with claim 11 including selectively tuning said filter means to the respective frequencies of said transmitted wave trains and selectively adjusting the Q of said filter means so that the filter output in response to each of said transmitted wave trains rises substantially to its steady state over a time equal to the duration of said respective transmitted wave train to which said filter is tuned and falls to about one-fourth its maximum amplitude over a time equal to the duration of said respective transmitted wave train to which said filter is tuned.

17. A method of signalling in accordance with claim 11 including selectively tuning said filter means to the respective frequencies of said transmitted wave trains and selectively adjusting the Q of said filter means so that the impulse response of said filter approximates the respective transmitted wave train to which said filter is tuned.

18. A method of signalling in accordance with claim 11 wherein said transmitted wave trains have substantially the same duration, including selectively tuning said filter means to the respective frequencies of said transmitted wave trains and selectively adjusting the Q of said filter means to be directly proportional to the frequency to which said filter is tuned.

19. A method of signalling in accordance with claim 11 wherein said selected cycles of said transmitted wave trains are the last cycles thereof.

20. A method of signalling in accordance with claim 11 wherein said second time relationship is such that said cycles of said detection wave trains corresponding to said selected cycles of said transmitted wave trains are substantially in phase near peaks thereof having like polarity.

21. A method of signalling in accordance with claim 11 wherein the transmitted signal approximates a signal having a continuously varying instantaneous frequency and a frequency versus time characteristic with a slope which increases monotonically as a function of time.

22. A method of signalling in accordance with claim 21 wherein said approximated signal begins at a time $-T/2$ and a frequency $f_{min.}$ and ends at a time $T/2$ and a frequency $f_{max.}$, and has an instantaneous frequency $f(t)$ equal to $$\frac{K(f_{max.}+f_{min.})}{2} + \frac{(f_{max.}-f_{min.})t}{T} + \frac{2(f_{max.}+f_{min.})t^2(1-K)}{T^2}$$

where K is a constant such that the frequency at $t=0$ is equal to $$\frac{K(f_{max.}+f_{min.})}{2}$$

$t$ is the variable time and T is the total duration of the signal.

23. A method of signalling in accordance with claim 22 wherein K is less than one.

24. A method of signalling in accordance with claim 23 where K is between about .86 and about .96.

25. A method of signalling in accordance with claim 11 wherein said frequencies of said transmitted wave trains are of the order of 100 cycles per second.

26. A method of signalling in accordance with claim 11 wherein the respective frequencies and durations of the transmitted wave trains satisfy the relationship:

$$\frac{(f_{i+1}-f_i)(t_{i+1}+t_i)}{2}=M$$

where $f_i$ is the frequency of a respective transmitted wave train, $f_{i+1}$ is the frequency of the transmitted wave train which has a frequency closest to and greater than $f_{i+1}$, $t_i$ is the duration of the transmitted wave train with frequency $f_i$, $t_{i+1}$ is the duration of the transmitted wave train with frequency $f_{i+1}$, and M is an integer.

27. A matched filter in accordance with claim 1 wherein said active filter means has an impulse response at each of the frequencies of the transmitted wave trains given by the equation:

$$R(t)=\{\sin(2\pi f_i t)\}e^{-\frac{k't}{t_i}}$$

where $R(t)$ is the impulse response, $t$ is time, $f_i$ is the frequency of a respective transmitted wave train, $t_i$ is the duration of the transmitted wave train with frequency $f_1$, and $k'$ is a dimensionless constant of approximate value 1.4.

References Cited

UNITED STATES PATENTS

| | | | |
|---|---|---|---|
| 2,624,876 | 1/1953 | Dicke | 343—17.2 X |
| 3,114,884 | 12/1963 | Jakowatz | 328—121 |
| 3,156,914 | 10/1964 | Welti | 343—17.2 X |
| 3,174,031 | 3/1965 | Hartmanis et al. | 235—181 |
| 3,174,032 | 3/1965 | White | 235—181 |
| 3,217,324 | 11/1965 | Adamsbaum et al. | 343—17.2 X |
| 3,176,296 | 3/1965 | Adams | 343—17.2 |
| 3,249,940 | 3/1966 | Erickson | 343—17.1 |
| 3,271,765 | 9/1966 | Pulford | 343—17.2 X |
| 3,299,427 | 1/1967 | Kondo | 343—17.2 X |

OTHER REFERENCES

H. L. Blasbalg and R. E. Keeler, IBM Technical Disclosure Bulletin, Adjustable Digital Matched Filter, vol. 7, No. 3, August 1964, pp. 183–184.

C. S. Clay and W. L. Liang, Geophysics, vol. XXVII, No. 6, part 1, Continuous Seismic Profiling With Matched Filter Detector, December 1962, pp. 786–789.

RODNEY D. BENNETT, *Primary Examiner.*

J. P. MORRIS, *Assistant Examiner.*

UNITED STATES PATENT OFFICE
CERTIFICATE OF CORRECTION

Patent No. 3,404,400                              October 1, 196

Park H. Miller, Jr.

It is certified that error appears in the above identified patent and that said Letters Patent are hereby corrected as shown below:

Column 1, line 25, "3,369,229" should read -- 3,363,229 -- Column 3, line 32, "systme" should read -- system --. Column lines 59 to 63, equation (4) should appear as shown below:

$$f(t) = \frac{K(f_{max.}+f_{min.})}{2} + \frac{(f_{max.}-f_{min.})t}{T} + \frac{2(f_{max.}+f_{min.})t^2(1}{T^2}$$

same column 9, line 68, "trans" should read -- trains --. Col 10, line 59, "timt" should read -- time --. Column 11, line 6! "inevrse" should read -- inverse --. Column 12, line 23, "a" should read -- at --. Column 13, line 3, "filter" should read -- filters --; line 13, "aong" should read -- along --; line 2( "relationship" should read -- relationships --. Column 15, lir 28, $\alpha 1/2/2\sqrt{R_1 C_1}$          should read          $\frac{\sqrt{\alpha}}{2\pi R_1 C_1}$ same column 15, line 29, $\alpha 1/2/f$          should read          $\frac{\sqrt{\alpha}}{\gamma}$ Column 16, line 18, "records" should read -- recorders --.

Signed and sealed this 10th day of March 1970.

(SEAL)
Attest:

EDWARD M. FLETCHER, JR.                          WILLIAM E. SCHUYLER, JR
Attesting Officer                                 Commissioner of Patents